United States Patent [19]

Gall et al.

[11] 4,135,533
[45] Jan. 23, 1979

[54] VEHICLE CLEANING SYSTEM

[75] Inventors: Herbert J. Gall, Camp Springs; Robert T. Noonan, Temple Hills, both of Md.

[73] Assignee: National Railroad Passenger Corporation, Washington, D.C.

[21] Appl. No.: 887,276

[22] Filed: Mar. 16, 1978

[51] Int. Cl.$^2$ .............................. B60S 3/04; B08B 3/02
[52] U.S. Cl. .................................... 134/104; 134/109; 134/123
[58] Field of Search ................... 134/45, 104, 109, 123

[56] References Cited

U.S. PATENT DOCUMENTS

| | | | |
|---|---|---|---|
| 2,419,397 | 4/1947 | Frohoff et al. | 134/123 |
| 3,024,795 | 3/1962 | Roller et al. | 134/123 X |
| 3,175,564 | 3/1965 | Baird, Jr. et al. | 134/123 X |
| 3,187,359 | 6/1965 | Takeuchi | 134/123 X |
| 3,337,896 | 8/1967 | Allen | 134/123 X |
| 3,378,018 | 4/1968 | Lawter | 134/109 |
| 3,409,030 | 11/1968 | Schmidt | 134/123 |
| 3,533,422 | 10/1970 | Alimanestiano | 134/45 |
| 3,701,356 | 10/1972 | Hanna et al. | 134/123 X |
| 3,774,625 | 11/1973 | Wiltrout | 134/123 X |
| 3,844,480 | 10/1974 | Taylor et al. | 134/45 X |

FOREIGN PATENT DOCUMENTS 1144609  2/1963  Fed. Rep. of Germany ........... 134/123

Primary Examiner—Robert L. Bleutge
Attorney, Agent, or Firm—Beveridge, De Grandi, Kline & Lunsford

[57] ABSTRACT

A system for cleaning vehicles, such as train cars, locomotives, buses, and large trucks, of various outer configurations, with optimum cleaning of each vehicle regardless of outer configuration and without use of brushes. The apparatus includes a prewet station, a wash station and a rinse station. The wash station has several conduit arches, each with an engineered nozzle arrangement that provides a specific impact angle in the order of about 80 degrees and a specific impact pressure in the order of from about 0.3 to about 0.5 psi of the washing liquid on vehicles of a specific configuration. The rinse station likewise has several conduit arches, each with an engineered nozzle arrangement that provides a specific impact angle in the order of about 80 degrees and a specific impact pressure in the order of from about 1.5 to about 2.0 psi of the rinse liquid on vehicles of a specific configuration. Each arch is shaped and sized to allow passage of the largest vehicle to be cleaned. The nozzle placement and design vary from arch to arch at the wash station and at the rinse station, and each arch provides a specific liquid spray pattern, including a specific impact angle and a specific impact pressure on vehicles of a particular associated configuration. At the prewet station each vehicle is sprayed by a prewet liquid which serves primarily to being the vehicle surface to the desired temperature, and so a single conduit arch with nozzles designed for a general overall spray pattern is provided at the prewet station. The liquid runoffs from the prewet station, the wash station, and the rinse station are collected and recycled separately. An operator determines the configuration of each vehicle entering the apparatus and activates the appropriate associated wash and rinse conduit arches. The equipment is housed within a building which can have air curtains at the building entrance and exit.

3 Claims, 7 Drawing Figures

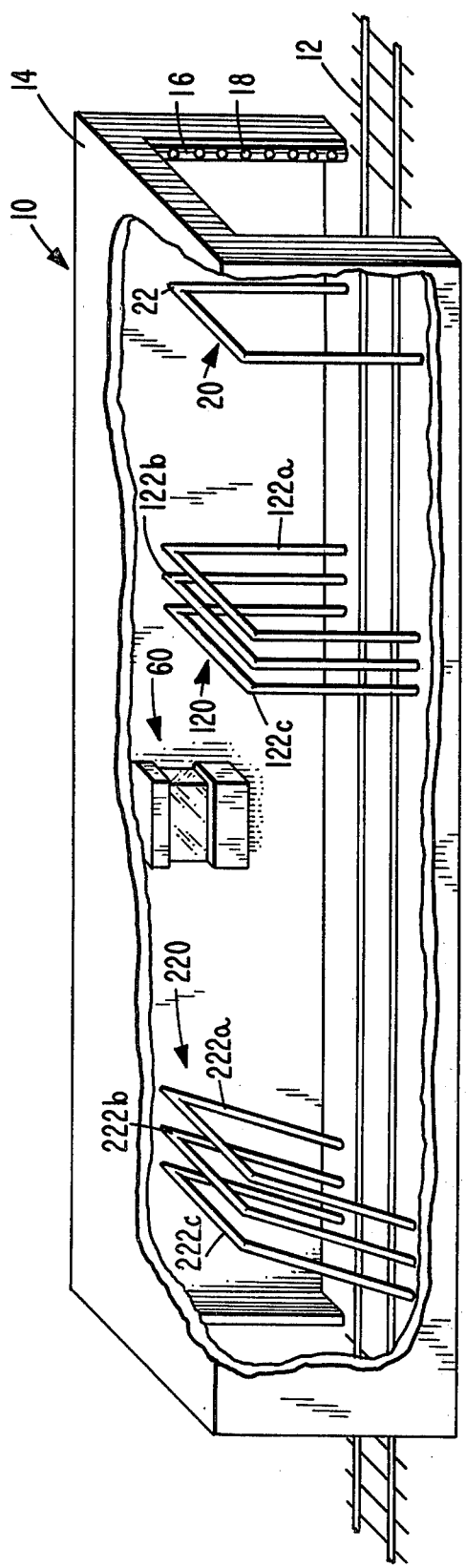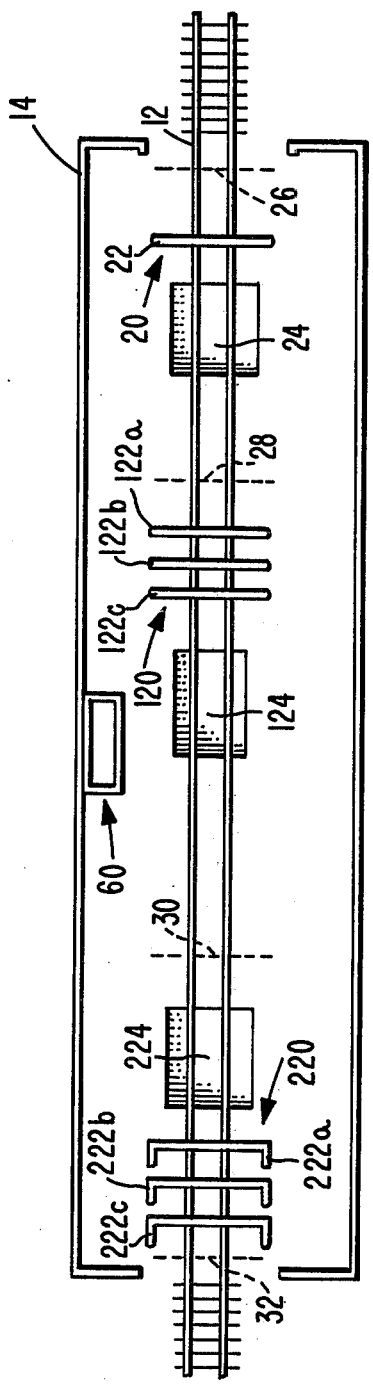
FIG. 1
FIG. 2

PREWET

WASH

RINSE

VEHICLE CLEANING SYSTEM

BACKGROUND OF THE INVENTION

The present invention pertains to an innovative and novel vehicle cleaning system. More particularly, the present invention pertains to a system for cleaning vehicles such as railway cars, locomotives, buses and large trucks without utilization of brushes, while assuring optimum cleaning of vehicles of different outer configurations.

The cleaning of large vehicles is a difficult, yet necessary, task. Many vehicle cleaning systems are known, but the majority of these include single conduits with fixed nozzles, moving nozzles to direct spray to various points, or brushes for contacting the vehicle's surface, or a combination thereof to remove dirt. These necessitate devices for controlling the brushes and/or nozzles and their movement. Such control devices are complex and subject to frequent malfunction. Brushless vehicle cleaning systems have been developed in which liquid at a high pressure impacts on the vehicle's surface to remove the dirt. It is now known that a liquid with a specific impact pressure striking the surface of a dirty vehicle at a specific impact angle will effectively clean the vehicle surface without brushes. Nevertheless, a vehicle cleaning system having a single set of wash nozzles and a single set of rinse nozzles, which may provide optimum liquid impact pressure for cleaning of vehicles of one particular outer configuration, does not provide satisfactory performance on vehicles of different outer configurations. Large fleets of vehicles, such as those of railroads, bus companies and trucking companies, generally include vehicles of a number of different outer configurations. Since such a high pressure brushless vehicle cleaning facility cannot provide uniform application of liquid at the specific impact angle and impact pressure on vehicles of every outer configuration, it cannot adequately clean all of the different vehicles in such a fleet. As a consequence, in the past it has been necessary to compromise the various optimization criteria in an attempt to develop a vehicle cleaning system for cleaning vehicles of several outer configurations. Such compromise has, of course, resulted in the development of vehicle cleaning systems which do not adequately clean any vehicle and which are prone to maintenance problems because of their complexity.

The large scale cleaning of large vehicles requires use of significant quantities of water and, likewise, develops significant quantities of waste liquid. The waste liquid contains different types of contaminants. Thus, for example, some of the waste liquid may include unemulsified oil. Other waste liquid may include emulsified oil. Sand, fine gravel, iron oxides and other forms of dirt may be included in some of the waste liquid. These different types of waste liquid may best be processed by different sets of equipment and techniques; yet, heretofore, vehicle cleaning systems which may have included waste liquid recycling have generally combined all the waste liquids and treated them in a single set of recycling equipment. Such an arrangement makes the recycling process very difficult and does not fully remove contaminants with the desired efficiency.

SUMMARY OF THE INVENTION

The present invention is a vehicle cleaning system providing optimum cleaning of vehicles, regardless of the vehicle outer configuration, in a brushless system, while recycling the maximum amount of waste liquids through separate sets of contaminant removal apparatus. In accordance with the present invention, a vehicle cleaning system is provided for cleaning of vehicles as the vehicles move on a vehicle path. In the preferred embodiment, the system includes a pre-wet station having a source of pre-wetting liquid and a single conduit arch through which each vehicle passes as it enters the system. The pre-wetting liquid aids in bringing the outer skin of the vehicles to the desired temperature for the cleaning operation. The system includes a wash station having a source of washing liquid and a first plurality of conduit arches extending over the vehicle path, with each arch connected to the source of washing liquid. Each arch of the first plurality has an engineered arrangement of nozzles for directing a spray of washing liquid onto vehicles of a specific configuration moving on the vehicle path through the wash station in a manner that achieves a specific impact pressure at a specific impact angle. The specific impact pressure of the wash liquid is in the order of about 0.3 psi to 0.5 psi and the specific impact angle of the wash liquid is in the order of about 80 degress. Likewise, the vehicle cleaning system of the present invention includes a rinse station having a source of rinsing liquid and a second plurality of conduit arches extending over the vehicle path, with each arch of the second plurality connected to the source of rinsing liquid. Each arch of the second plurality has an engineered arrangement of nozzles for directing a spray of rinsing liquid onto vehicles of a specific configuration moving on the vehicle path through the rinse station in a manner that achieves a specific impact pressure at a specific impact angle. The specific impact pressure of the rinse liquid is in the order of about 1.5 psi to 2.0 psi and the specific impact angle is in the order of about 80 degrees. A control unit is provided to permit an operator to selectively actuate a set of one arch of the first plurality of arches, for spraying washing liquid onto a vehicle at the wash station, and its mated arch of the second plurality of arches, for spraying rinsing liquid onto the vehicle as it reaches the rinse station.

At each of the wash station and the rinse station, each conduit arch, together with its nozzles, is configured to provide the specific impact angle and pressure of its liquid on the surface of a vehicle of a specific outer configuration. Accordingly, the several matched sets of arches are designed so that each matched set include nozzles of different specific designs and positioning to apply liquid at a specific impact angle and a specific impact pressure onto vehicles of a specific outer configuration. Consequently, optimum cleaning is provided for vehicles of any of numerous outer configurations by using for each different type of vehicle a matched set of one wash arch and one rinse arch whose nozzles are designed and positioned to provide the specific impact angle and the specific impact pressure of the wash liquid and of the rinse liquid for the outer configuration of that particular vehicle.

The control unit is utilized to select the appropriate wash arch and the appropriate rinse arch in accordance with the outer configuration of the vehicle and then to activate pumps and valves which deliver the wash liquid and the rinse liquid through the selected arches. Preferably, the vehicle configuration is determined, and the controls are operated by an operator.

The vehicle cleaning system recycles the liquids utilized in the cleaning operation. Thus, these liquids are captured and directed to underfloor pits from which they are passed through contaminant removal equipment such as coalescers, centrifuges, filters, or a combination of these. The cleaned liquids are then sent to supply tanks from which they pass to the activated conduit arches under direction of valves selected by the operator. A separate set of contaminant removal equipment is provided for each station: the pre-wet, wash, and rinse, so that the waste liquid from each station, with its particular contaminants, is handled in the most efficient manner.

To provide optimum washing, the nozzles of the wash station conduit arches are directed uptrack, for example at an angle so that the washing liquid impacts on the surface of the vehicles at a specific angle in the order of about 80 degrees, thereby aiding penetration of the washing liquid through the dirt to reach the vehicle surface-dirt interface. The nozzles of the rinse station arches are likewise directed uptrack to achieve a specific impact angle in the order of about 80 degrees. The rinse station conduit arches are inclined in an uptrack direction so that the top of each vehicle is rinsed before the sides of the vehicle. Consequently, the rinse water runoff from the top of the vehicle is further rinsed from the vehicle sides.

Best operation of the vehicle cleaning system is provided in an enclosed environment, and so, preferably, the vehicle cleaning system is housed within a building. The entrance and exit of the building are provided with air curtains to aid in maintaining the building temperature for the cleaning operation. In addition, the exit air curtain provides at least partial drying of the vehicles prior to their emergence from the cleaning system.

BRIEF DESCRIPTION OF THE DRAWINGS

These and other aspects and advantages of the present invention are more apparent in the following detailed description and claims, particularly when considered in conjunction with the accompanying drawings in which like parts bear like reference numerals. In the drawings:

FIG. 1 is a perspective view, partially broken, depicting a vehicle cleaning system in accordance with the present invention;

FIG. 2 is a schematic plan view of a vehicle cleaning system in accordance with the present invention;

Each of FIGS. 3A, 3B and 3C is a flow diagram illustrating one of the stations within a preferred embodiment of a vehicle cleaning system in accordance with the present invention.

DESCRIPTION OF A PREFERRED EMBODIMENT

Figure 3A:
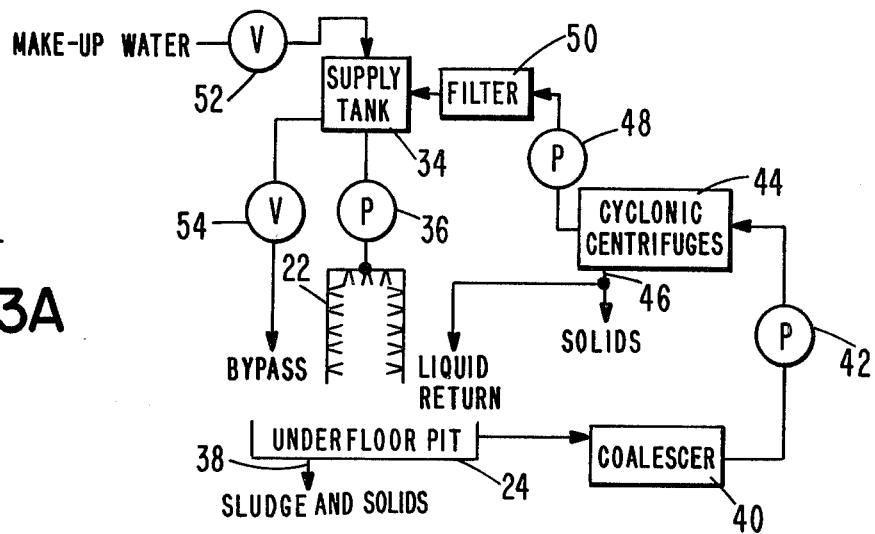

Vehicle cleaning system 10, depicted in FIG. 1, is illustrated as suited for the cleaning of railway cars and locomotives as these vehicles move on railway track 12. The vehicle cleaning system preferably includes three stations. A pre-wet station 20 is provided to aid in bringing the surface of the vehicles to the desired temperature. A wash station 120 is provided for application of an aqueous solution of soap, detergent or other cleaning medium to the dirty vehicles. A rinse station 220 is provided to rinse the dirty, soapy liquid from the surface of the vehicles and to complete the cleaning operation.

Pre-wet station 20 includes a single arch 22, formed of a conduit which is arched over track 12. Arch 22 includes a plurality of suitably arranged nozzles for spraying water onto a vehicle as the vehicle enters cleaning system 10. Water is provided to the arch 22 at a relatively low pressure and a moderate flow rate, for example, a manifold pressure in the order of about 100 psig at a flow rate in the order of approximately 150 gallons per minute.

Wash station 120 includes several conduit arches and is illustratively depicted in FIG. 1 as including three arches 122a, 122b, and 122c. Wash station 120 is spaced from pre-wet station 20 in the downtrack direction by a distance which eliminates conflicts of the liquid spray patterns of the two stations, for example, a minimum distance in the order of about 25 feet.

Each arch 122a, 122b, and 122c at wash station 120 is configured to provide a specific impact angle of about 80 degrees and a specific impact pressure of about 0.3 psi to 0.5 psi of the wash liquid on vehicles of a given outer configuration. Thus, the design and the particular arrangement of the nozzles of each arch are selected to provide a specific impact pressure from that arch onto a vehicle of a specific outer configuration. While FIG. 1 illustrates three arches 122a, 122b, and 122c at wash station 120, any desired number might be provided in accordance with the number of vehicle outer configurations expected.

Similarly, rinse station 220 includes several arches of rinse nozzles and is illustratively depicted in FIG. 1 as including three arches 222a, 222b, and 222c. Each of the rinse arches is likewise configured to provide a specific impact angle of about 80 degrees and a specific impact pressure of about 1.5 psi to 2.0 psi of rinse liquid on vehicles of a specific outer configuration, just as are the wash arches. Each of the rinse station arches 222a, 222b, 222c, . . . has a corresponding wash station arch 122a, 122b, 122c, . . . whose spray pattern is identical except for the impact pressure and the volume of liquid sprayed. Rinse station 220 is at a distance downtrack from wash station 120 which permits sufficient dwell time for the wash liquid to react chemically with the dirt at the vehicle surface-dirt interface. The dwell time is, of course, dependent upon the distance between wash station 120 and rinse station 220 and upon the speed of travel of the vehicles as they move between the two stations.

As seen in FIG. 1, the rinse arches 222 are inclined in the uptrack direction so that the top of a vehicle is contacted by the rinse spray before the sides of the vehicle. As a consequence the runoff from the top of the vehicle does not redeposit dirt on the freshly rinsed sides.

FIG. 2 is a schematic illustration of the layout of the cleaning system of FIG. 1. As seen there, pre-wet station 20, in addition to including pre-wet arch 22, has an underfloor pit 24 for catching the pre-wet liquid which falls from the vehicles at pre-wet station 20. A baffle or dam 26 is provided at the inlet to pre-wet station 20 and a second baffle or dam 28 at the outlet, with the surface or bed of track 12 properly inclined to cause the runoff between dams 26 and 28 to flow to underfloor pit 24, thereby catching substantially all of the pre-wet runoff at that runoff pit.

Wash station 120 commences at dam 28 and continues to dam 30. In addition to wash arches 122a, 122b, 122c, ..., wash station 120 includes an underfloor pit 124. The floor or bed of track 12 is preferably sloped between dams 28 and 30 to cause substantially all of the wash runoff to enter pit 124.

Rinse station 220 is bounded by dams 30 and 32 and, in addition to rinse arches 222a, 222b, 222c, ..., includes underfloor pit 224. Again, the floor or bed of track 12 is sloped between dams 30 and 32 to cause substantially all the runoff to enter pit 224.

Because the runoff liquids from the pre-wet station, from the wash station, and from the rinse station contain different contaminants, they have different recycling requirements. Consequently, separate recycling systems are provided for each of the three stations. FIG. 3A is a flow diagram depicting operation of pre-wet station 20 of a vehicle cleaning system in accordance with a preferred embodiment of the present invention. The prewetting liquid is drawn from supply tank 34 by pump 36 which applies the liquid to the pre-wet conduit arch 22. The liquid runoff passes to underfloor pit 24. Solids and sludge are removed from pit 24 through outlet 38, while the liquid passes to coalescer 40. If desired, underfloor pit 24 can include a belt skimmer, a grit screw and/or other contaminant removal devices. The unemulsified oil components are removed from coalescer 40. The remaining liquid flows under urging of pump 42 to a set of cyclonic centrifuges 44 which separate solids from the liquid. The solids are discharged at outlet 46. Some amount of liquid is returned from outlet 46 to underfloor pit 24. The major portion of the liquid is drawn by pump 48 through optional filter 50 to return to supply tank 34. Thus the liquid is cleaned and returned for reuse. While the majority of the pre-wetting liquid is recycled, some amount of liquid is lost, and so make-up water is provided as necessary through valve 52, which might draw such water from the supply tank of the rinse station 220. Preferably, a bypass line from supply tank 34 can bypass the liquid through valve 54 to underfloor pit 24 to maintain the system active in a standby mode between vehicles so that the system does not become septic.

Figure 3B:
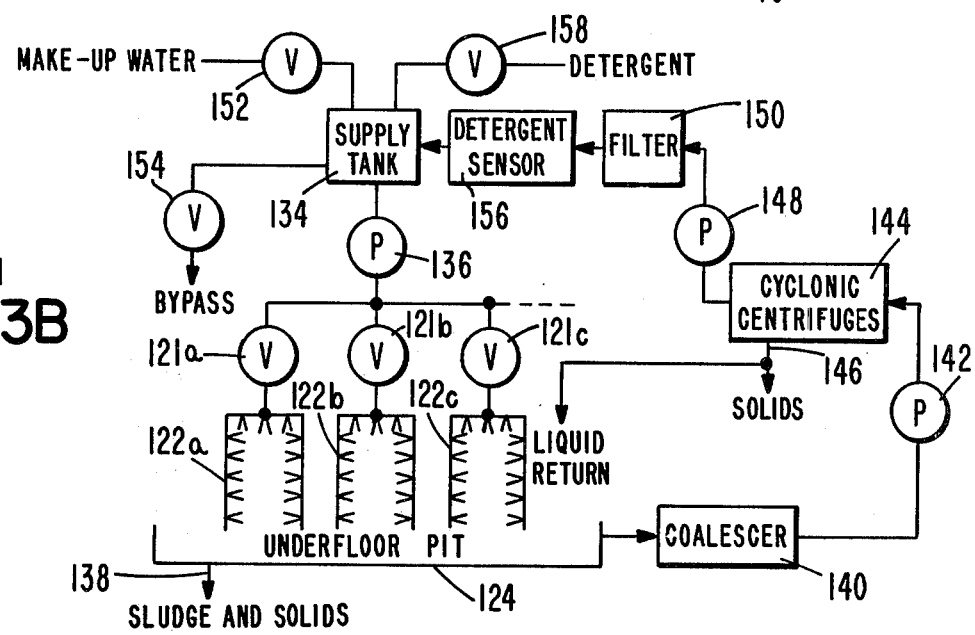

FIG. 3B is a similar flow diagram depicting operation of wash station 120. The washing liquid from supply tank 134 is applied by pump 136 through the selected valve 121a, 121b, 121c, ..., to the associated wash conduit arch 122a, 122b, 122c, ... The liquid runoff from underfloor pit 124 passes to coalescer 140, while solids and sludge are removed through outlet 138 from pit 124. Again, underfloor pit 124 can be provided with a belt skimmer, a grit screw and/or other contaminant removal devices, if desired. Any unemulsified oil components are removed from coalescer 140, while the remaining liquid is passed by pump 142 to a set of cyclonic centrifuges 144. Solids are discharged from centrifuges 144 through outlet 146, along with a slight amount of liquid. The major portion of the liquid is drawn by pump 148 through optional filter 150 and optional detergent sensor 156 to return to supply tank 134. Make-up water is provided as necessary through valve 152 which might draw such water from the supply tank of rinse station 220. When the concentration of detergent in the recycled liquid is low, or when make-up water is being supplied through valve 152, valve 158 is actuated to provide additional detergent. A bypass line is provided through valve 154 to underfloor pit 124 to assure that the system does not become septic.

Figure 3C:
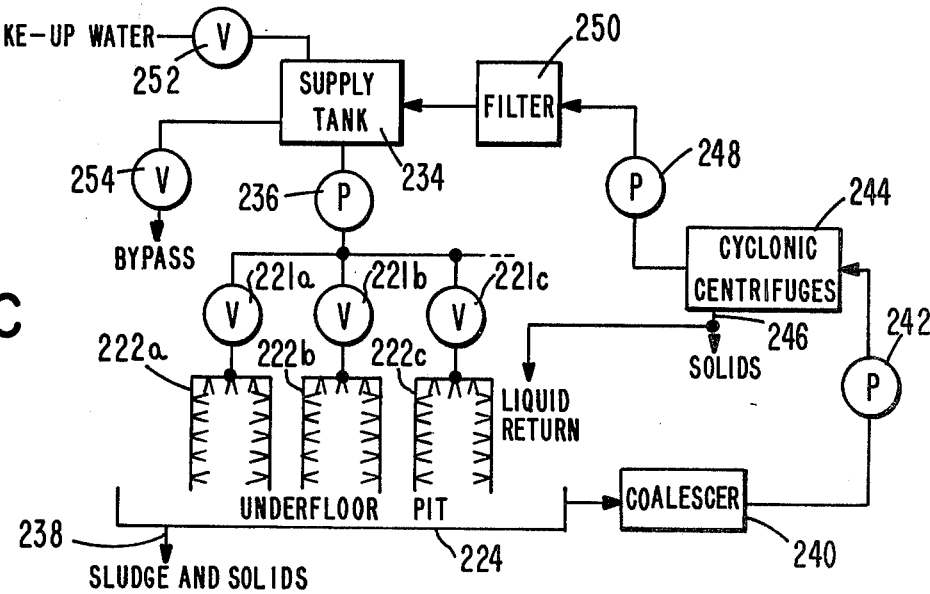

FIG. 3C shows the corresponding flow diagram for rinse station 220. The rinsing liquid from supply tank 234 is pumped by pump 236 through the selected valve 221a, 221b, 221c, ... to the associated rinse conduit arch 222a, 222b, 222c, ... The liquid runoff from underfloor pit 224 passes to coalescer 240. Solids and sludge are removed from pit 224 through outlet 238. Underfloor pit 224 can be provided with a belt skimmer, a grit screw and/or other contaminant removal devices, if desired. Unemulsified oil components in the runoff liquid are removed from coalescer 240, and the remaining liquid is pumped by pump 242 to a set of cyclonic centrifuges 244. Solids are discharged from centrifuges 244 at outlet 246, along with some amount of liquid. The majority of the liquid is pumped by pump 248 through optional filter 250 and back to supply tank 234. Make-up water is provided from a supply of fresh water through valve 252, as needed. A bypass line through valve 254 to underfloor pit 224 assures that the system does not become septic when no vehicles are being rinsed. The rinse station flow diagram of FIG. 3C is thus similar to that of the wash station shown in FIG. 3B, except for omission of the detergent sensor, inlet line, and valve, and except that make-up water is obtained from a source of fresh water for rinse station 220, while pre-wet station 20 and wash station 120 might draw make-up water from rinse station supply tank 234.

The use of separate liquid recycling equipment for each of the three stations 20, 120, and 220 results in improved control, greater recovery speed, easier maintenance, and greater economy. The liquid runoff differs at each of the three stations, and the components of the separate liquid recycling loops can be selected for best operation on the particular runoff liquid generated at the three stations.

In a typical railroad installation for example, at pre-wet station 20, the supply tank 34 may have a capacity in the order of about 1100 gallons, pump 36 a capacity in the order of about 150 gallons per minute at a pressure in the order of about 100 psig, underfloor pit 24 a capacity in the order of about 2000 gallons, coalescer 40 a capacity in the order of about 200 gallons per minute, pump 42 a capacity in the order of about 150 gallons per minute delivered at cyclonic centrifuges 44 at a pressure of about 45 psig, cyclonic centrifuges 44, likewise, have a total capacity in the order of about 150 gallons per minute. Likewise, typically at wash station 120 the supply tank 134 may have a capacity in the order of about 1100 gallons and be equipped with a heater and a mixer, pump 136 may have a capacity in the order of from about 90 to about 120 gallons per minute at a pressure in the order of from about 500 psig to about 750 psig, underfloor pit 124 may have a capacity in the order of about 1500 gallons, coalescer 140 a capacity in the order of about 200 gallons per minute, pump 142 a capacity in the order of about 90 gallons per minute, and centrifuges 144 a capacity in the order of about 120 gallons per minute. At a typical rinse station 220, supply tank 234 may have a capacity in the order of about 2200 gallons, pump 236 a capacity in the order of about 300 gallons per minute at a pressure in the order of about 900 psig, underfloor pit 224 a capacity in the order of about 5000 gallons, and coalescer 240, pump 242, and the set of centrifuges 244 each a capacity in the order of about 300 gallons per minute. The tanks, pits, and equipment must be sized to the time requirements of washing. Railroad train washing, for example, is usually sporadic, varying from short to very long trains.

Preferably all the recycling equipment, pumps, etc. are housed in a manner isolating them from the corrosive effects of the wash and rinse areas, while all the piping is kept readily accessible for maintenance or possible modification, e.g., in a pipe trench.

As each vehicle to be cleaned approaches pre-wet station 20, its configuration is determined, and the appropriate pumps and valves are actuated. The determination of the vehicle configuration and actuation of controls for the pumps and valves is preferably done by an operator in a control booth 60 with a clear view of the vehicle cleaning system. As each vehicle approaches, the operator determines its outer configuration and actuates appropriate controls, for example push buttons which energize the appropriate pumps and solenoids that control the appropriate valves. There must be a conduit arch at wash station 120 and a conduit arch at rinse station 220 appropriate for each vehicle outer configuration, and the selected controls actuate the valves and pumps for a mated set of one wash conduit and one rinse conduit. Separate controls are provided for the pre-wet conduit, for the wash conduits and for the rinse conduits, and the operator actuates a conduit at each station in turn as the vehicle approaches and leaves the respective stations, thereby minimizing power, water and detergent requirements.

The several conduit arches at wash station 120 and at rinse station 220 are designed to provide a specific impact angle and a specific impact pressure of the wash liquid and of the rinse liquid on the surface of the vehicles of specific outer configurations. Thus, a wash conduit and a rinse conduit set is provided for each vehicle configuration which is expected to utilize the vehicle cleaning system. Each conduit arch is of the same size and shape, determined by the size and shape of the outer configuration of the largest vehicle that will pass through the cleaning system. The parameters which are varied on the several conduits include, for example, the number of nozzles, the placement of the nozzles, the flow capacity of the nozzles, the spray pattern of the nozzles and the spray angle of the nozzles. The preferred spray pattern is a linear or knife edge pattern having as small a thickness as possible, preferably about one-fourth inch thick, and having a width dependent upon the spray angle and the distance from the nozzle to the vehicle surface. The overall design of each conduit arch is such that the liquid emitted from the arch impacts on the surface of vehicles of the configuration for which the conduit arch is designed at a specific impact angle and with a specific impact pressure. By way of example, for the wash arches this will be an impact pressure at the vehicle surface in the order of from about 0.3 psi to about 0.5 psi. This impact pressure permits the wash spray to penetrate to the vehicle surface-dirt interface. This penetration is enhanced if the nozzles in the wash arches 122 are directed at the approaching vehicle at an angle of about 80 degrees. However, a certain number of nozzles may be directed downtrack to wash the trailing end of each vehicle as it passes wash station 120.

The spacing between the conduit arches of wash station 120 and the conduit arches of rinse station 220 is such that the wash liquid has sufficient dwell time to loosen the dirt at the vehicle surface-dirt interface before the rinse spray is applied to the vehicle. The conduit arches of the rinse station 220 are likewise designed to provide optimum rinsing, and again the various parameters of each arch are controlled to provide a specific impact pressure on the surface of vehicles of each configuration, for example, an impact pressure in the order of from about 1.5 psi to about 2.0 psi. Preferably, as illustrated in FIG. 1, the rinse arches are inclined at an angle in the order of about 45 degrees uptrack toward approaching vehicles to rinse the top of each vehicle before the sides so that the runoff from the vehicle top is further rinsed off the vehicle sides by the sprays.

Figure 4A:
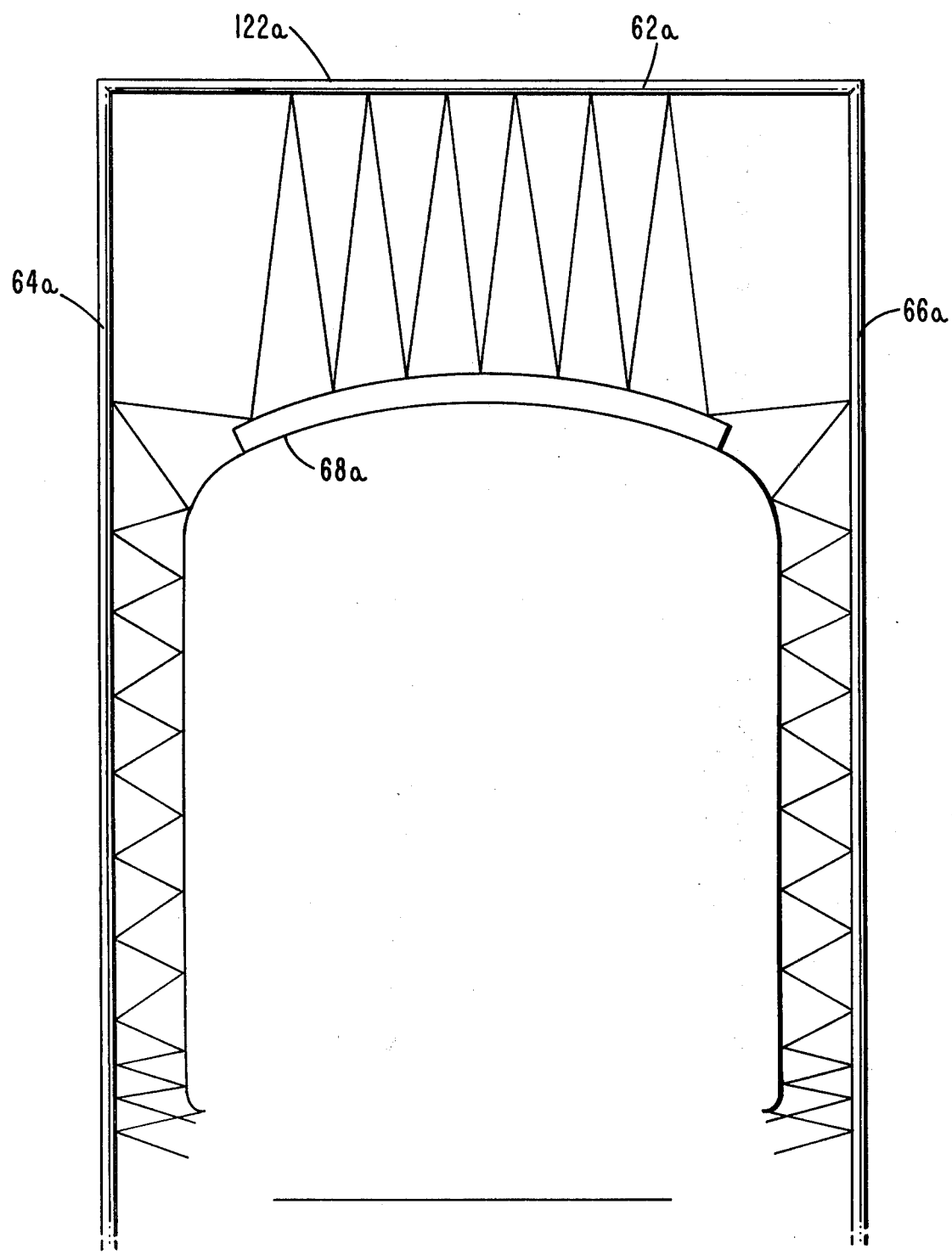
FIGS. 4A and 4B illustrate two of the possible configurations of nozzles which can be utilized to provide high pressure, brushless cleaning of vehicles of various outer configurations in accordance with the present invention.
Figure 4B:
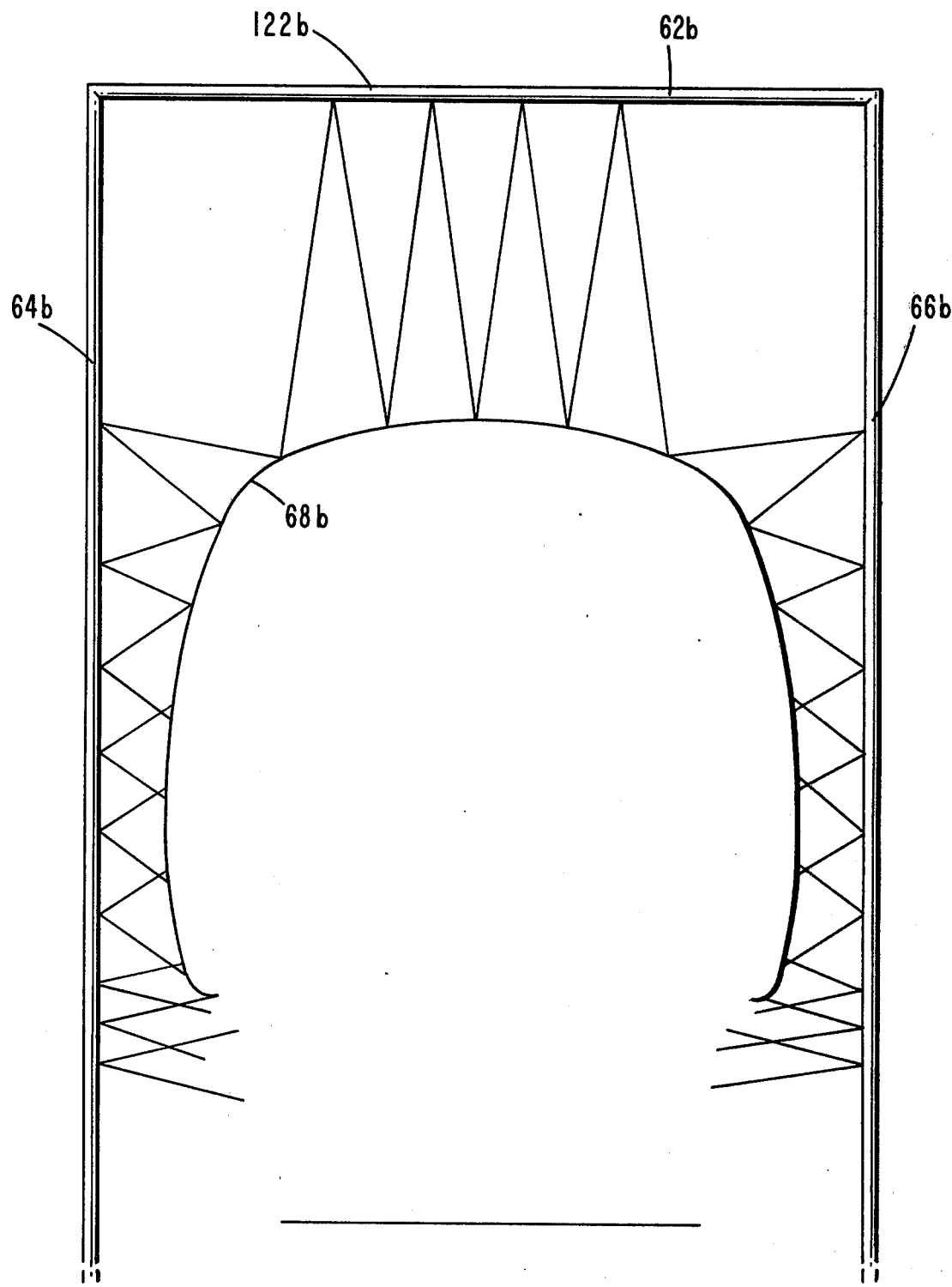

FIGS. 4A and 4B illustrate typical variations which can be designed into the wash conduit arches 122 and rinse conduit arches 222. Thus, in FIG. 4A a conduit arch, designated as arch 122a, is shown having a horizontal member 62a and two vertical members 64a and 66a. A plurality of nozzles are positioned in horizontal member 62a and in each vertical member 64a and 66a. FIG. 4A illustrates the outline of a vehicle 68A on which the liquid from the several nozzles impacts. For comparison, FIG. 4B illustrates another vehicle outline 68b of different configuration. Arch 122b in FIG. 4B has a horizontal member 62b and two vertical members 64b and 66b, with nozzles on each member 62b, 64b, and 66b. Each conduit arch 122a, 122b, 122c, . . . , and 222a, 222b, 222c, . . . provides a specific impact of the spray on the surface of a vehicle of one particular outer configuration. Conduit arches 22, 122, 222 might be charged or supplied with their respective liquids at any point, preferably at the top center of each arch since this results in more uniform nozzle pressure.

Best operation of the vehicle cleaning system of the present invention is achieved in an enclosed environment. This helps maintain the desired operating temperatures and minimizes liquid loss. Thus, FIGS. 1 and 2 depict the pre-wet station 20, the wash station 120 and the rinse station 220 within a building 14 through which track 12 passes. Around the entrance 16 of building 14 a number of air nozzles 18 are positioned to provide an air curtain through which an entering vehicle passes as it enters the vehicle cleaning system. This air curtain aids in maintaining the interior of building 14 at the desired temperature. A second air curtain is provided at the vehicle exit. In addition to aiding in maintaining the interior of building 14 at the desired temperature, this exit air curtain aids in partially drying the cleaned vehicles.

If desired, the arches at one or more of the stations 20, 120, and 220 can include nozzles positioned to spray the vehicle truck and/or undercarriage. If pantograph equipped train cars are to be cleaned, then the conduit arches must be provided in two sections to permit passage of the pantograph, and minor design changes in charging such arches may be required.

Thus, it is seen that, although the present invention has been described with reference to preferred embodiments, numerous modifications might be made, and still the result would come within the scope of the invention.

What is claimed is:

1. A high-pressure brushless system for cleaning large vehicles on a vehicle path as the vehicles pass through a pre-wet station, a wash station and a rinse station, with the wash station and the rinse station capable of directing sprays of washing liquid and rinsing liquid onto vehicles of specific outer configurations at a specific impact angle and a specific impact pressure to achieve optimum cleaning of vehicles of various outer configurations, said system comprising a source of pre-wetting liquid; a pre-wet conduit arch at the pre-wet station and connected to the source of pre-wetting liquid and having an arrangement of nozzles designed to direct sprays of pre-wetting liquid onto a vehicle moving on the vehicle path through the pre-wet station to adjust the vehicle body temperature; a source of washing liquid; a plurality of wash conduit arches at the wash station, each of the wash conduit arches connected to the source of washing liquid and having a particular arrangement of nozzles designed to direct sprays of washing liquid onto a vehicle moving on the vehicle path through the wash station, with each arch and the nozzles thereof of the wash conduit arches designed to provide a specific impact angle and a specific impact pressure of washing liquid on the surface of a vehicle having a specific outer configuration and moving on the vehicle path through the wash station; a source of rinsing liquid; a plurality of rinse conduit arches at the rinse station, each of the rinse conduit arches connected to the source of rinsing liquid and having a particular arrangement of nozzles designed to direct sprays of rinsing liquid onto a vehicle moving on the vehicle path through the rinse station, with each arch and the nozzles thereof of the rinse conduit arches designed to provide a specific impact angle and a specific impact pressure of rinsing liquid on the surface of a vehicle having a specific outer configuration and moving on the vehicle path through the rinse station; and control means for selectively activating a mated set of one wash arch, for spraying washing liquid therefrom, and one rinse arch, for spraying rinsing liquid therefrom.

2. A system as claimed in claim 1 capable of recycling the liquid runoff from each of the pre-wet station, the wash station, and the rinse station through separate recycling loops to achieve most efficient and complete cleaning of the runoff liquids, said system further comprising a first underfloor pit for catching liquid runoff from the pre-wet station; first recycling means receiving pre-wet liquid runoff from the first underfloor pit for removing contaminants from the pre-wet liquid runoff and returning the thus cleaned pre-wet liquid runoff to the source of pre-wetting liquid; a second underfloor pit for catching liquid runoff from the wash station; second recycling means receiving wash liquid runoff from the second underfloor pit for removing contaminants from the wash liquid runoff and returning the thus cleaned wash liquid runoff to the source of washing liquid; a third underfloor pit for catching liquid runoff from the rinse station; third recycling means receiving rinse liquid runoff from the third underfloor pit for removing contaminants from the rinse liquid runoff and returning the thus cleaned rinse liquid runoff to the source of rinsing liquid; and further control means for separately operating each of said first, second and third recycling means.

3. A system as claimed in claim 1 in which the specific impact angle is in the order of about 80°, the specific impact pressure of washing liquid is in the order of from about 0.3 to about 0.5 psi, and the specific impact pressure of rinsing liquid is in the order of from about 1.5 to about 2.0 psi.

* * * * *